May 3, 1960            J. E. STERNER            2,935,022

SELF DESTRUCTION CIRCUIT FOR PROJECTILE FUZES

Filed March 11, 1946

INVENTOR
JOHN E. STERNER
BY Q. Baxter Warner
ATTORNEYS

United States Patent Office 2,935,022
Patented May 3, 1960

2,935,022

SELF DESTRUCTION CIRCUIT FOR PROJECTILE FUZES

John E. Sterner, Silver Spring, Md., assignor to the United States of America as represented by the Secretary of the Navy Application March 11, 1946, Serial No. 653,492

3 Claims. (Cl. 102—70.2)

The present invention relates to self-destruction arrangements for use with proximity fuzes and it is of particular utility in fuzes of the type incorporating a grid-controlled gas-filled electron tube.

Projectiles equipped with such fuzes become sources of great danger, if fired toward enemy aircraft at high angles of elevation, when they miss their targets and return in an unexploded condition to the vicinity of their origin, where they may cause damage. Various preventive measures have been devised in order to cause a projectile to destroy itself before it approaches too near its point of origin on its fall.

In those fuzes which depend on the triggering of a thyratron tube, ignition of the electrically operable primer or other firing device is caused by decreasing the grid bias sufficiently to permit the tube to fire. Such fuzes usually contain small batteries of the deferred-action type. The batteries are activated only after the shell is fired and are short-lived, the total life of each being only a few minutes. These batteries are used to supply the anode, grid, and filament voltages of the thyratron during the short time of projectile flight.

The present invention relates to an arrangement for abridging the already brief life of the grid-bias source, thereby causing that bias to decrease, at a more or less predeterminable time, to a value sufficiently low to permit firing to take place. The invention broadly involves the imposition of a relatively heavy load upon the bias battery, whereby it rapidly becomes exhausted.

The invention is described herein in connection with the accompanying drawing, in which.

Figure 1:
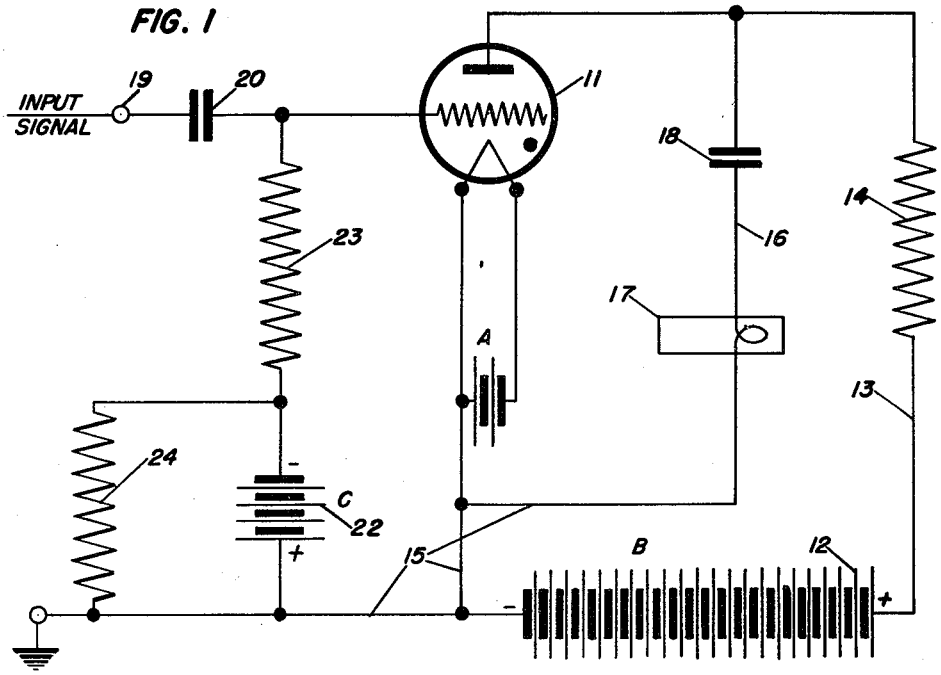
Fig. 1 is a diagram of a circuit embodying the invention in a preferred form.

Referring to Fig. 1, the circuit comprises a thyratron 11, a source of anode voltage there shown as B-battery 12, a conductor 13 in series with a resistor 14 of the order of 1 megohm, and a ground connection 15, whereby voltage is supplied to the anode-cathode circuit of the thyratron, the polarities being as indicated.

In parallel to the anode-cathode circuit there is a circuit comprising the conductor 16 and ground connection 15, in which are inserted, in series, a squib 17 and a condenser 18, having a capacitance of the order of 1 mfd.

Upon attainment of target proximity the input signal impulse, for temporarily decreasing the grid bias and causing the thyratron to fire, is introduced in the input circuit comprising terminal 19 and ground 15, terminal 19 being coupled to the tube grid by a condenser 20.

A grid bias or C-battery 22 and a grid resistor 23 are connected in series between grid and grounded cathode of tube 11, to supply, normally, a sufficient negative bias to the grid to prevent flow of anode current.

A resistor 24, here indicated as 50 ohms, is permanently connected to the terminals of battery 22, to act as a load thereon.

It will be noted that no switches are disclosed in the battery circuits. Such switches are not necessary, inasmuch as the batteries are of the "deferred-action" type, each being so constructed that no electrolyte touches their electrodes until firing of the projectile releases the electrolyte and brings it into contact with the electrodes, thereby initiating electrochemical action. Thus, no current flows in any of the above-disclosed circuits until the projectile has been fired.

Immediately upon activation of the batteries, condenser 18 starts to charge through the high resistance 14. The charging current is relatively small, due to the inclusion of high resistance 14 in the charging path, and is insufficient to cause ignition of squib 17.

Firing of tube 11 is prevented by the bias impressed on its grid by battery 22. Initially this bias is practically the same as would be the open-circuit voltage of the C-battery, but soon the excessive current drain due to the relatively small resistor 24 begins to exhaust battery 22, causing the grid bias to drop rapidly to near zero in about 15 or 20 seconds, in the cases illustrated in Figs. 2 and 3. Without such load the bias battery life might normally be about 100 seconds.

This reduced period of C-battery life is so adjusted as to permit the projectile to pass through its point of highest elevation when fired at high trajectories, and to descend somewhat therefrom, and is thus normally more than ample to allow the projectile to attain its target. If, then, no firing signal caused by target proximity has been impressed on the tube input circuit before expiration of the abridged battery life, the tube fires, due to drop of grid bias by failure of battery 22. Ignition of squib 17 is caused by the rapid discharge of condenser 18 through the circuit comprising condenser 18, the low-impedance anode-cathode breakdown path of tube 11, squib 17 and conductor 16. The projectile is accordingly detonated before it becomes a hazard of the indicated character.

A variation of the time at which such self-destruction occurs is effected by suitable choice of the size of the resistor 24. For instance, a 25 ohm resistor would probably cause exhaustion of the same battery in approximately one-half the elapsed time, since double the current would flow, whereas a 100 ohm resistor would substantially double the elapsed time.

A further factor to be considered is the material of which resistor 24 is made. It is well known that most metals have a positive resistance-temperature coefficient, while carbon has a negative one. If, then, the resistors are made physically small enough to be somewhat overloaded and, therefore, to be heated substantially, it is possible substantially to increase the resistance of wire-wound resistors, or substantially to decrease that of carbon resistors, thus modifying the current drain, the metal resistor tending to keep the voltage up for a longer time, while the carbon resistor would increase the drain and thus shorten the battery life correspondingly, given the same initial resistance.

Figure 2:
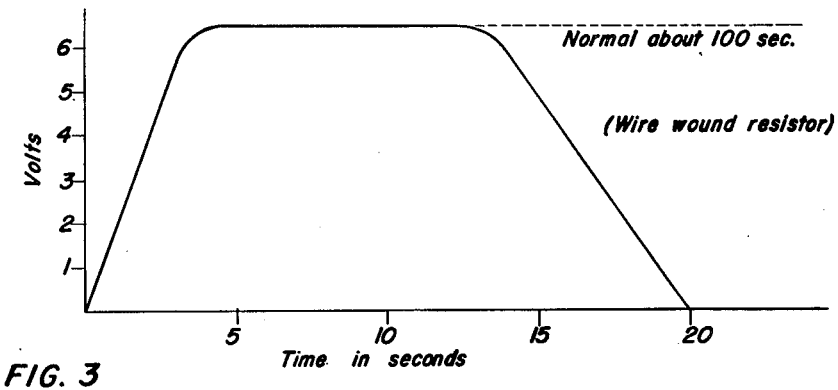
Fig. 2 illustrates the voltage-time relations of a bias battery shunted by a metal resistor.
Figure 3:
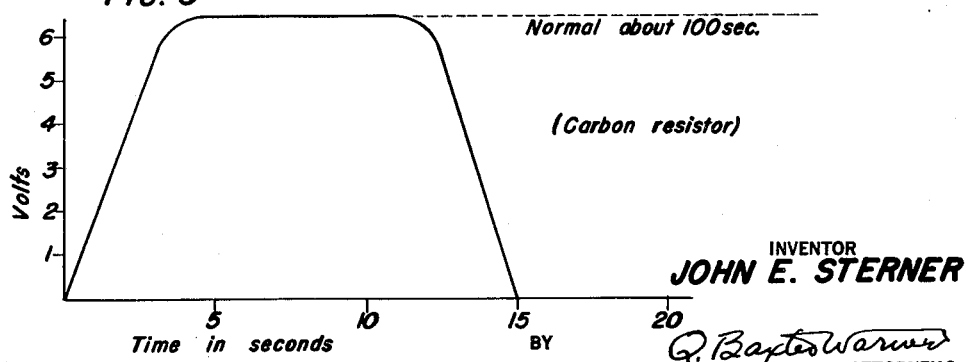
Fig. 3 illustrates similar characteristics when a carbon resistor is used.

These results are illustrated in Figs. 2 and 3, which comprise idealized curves, Fig. 2 showing that a wire-wound resistor gives substantially full voltage through about 13 seconds, and that the bias voltage drops to zero at about the end of 20 seconds, while Fig. 3 shows that with a carbon resistor the full voltage is maintained for a shorter period and the ultimate voltage drop occurs sooner, say at the end of the 15th second, and is more abrupt, as shown by the steeper slope of the descending portion of the curve. Both these resistors are assumed to have a magnitude of 50 ohms when cold. By varying the resistance and/or the material of the resistors used as the C-battery load, self-destructor action may be predetermined over a wide time or projectile-flight range.

The circuit parameters herein disclosed are illustrative only and are not intended to limit the invention.

While there have been shown what are at present considered to be the preferred embodiments of the invention, it will be obvious to those skilled in the art that various changes may be made therein without departing from the invention, and it is intended in the appended claims to cover all such equivalents as fall within the true scope of the invention and outside of the prior art.

I claim:

1. A fuze for use in an explosive missile of the type actuated by a reflected signal from the target comprising, a gas-filled triode having a grid connected to receive said signal, a first resistor and a first battery in series with each other and connected between said grid and the cathode of said triode, said first battery providing sufficient grid bias to make said triode non-conducting in the absence of a signal on said grid, a second resistor and a second battery serially connected between the cathode and the plate of the triode, a condenser and a squib connected in series with each other and in parallel with the second resistor and second battery whereby said condenser is adopted to be charged by said second battery, a third resistor connected in shunt relation to the first battery, both of the batteries being of the deferred-action type and including means for making said batteries operative on projection of the missile, said first battery having a relatively low charge capacity and said third resistor a relatively low resistance so that said battery charge is depleted within the time of flight of said missile whereby the condenser is permitted to discharge through the squib upon the impression of said signal on the grid and, in the absence of said signal, the voltage of the first battery drops to a value permitting the same discharge.

2. In a fuze for use in an explosive aerial missile of the type actuated by a signal reflected from the target, a self destroying triggering circuit comprising, a gas filled discharge tube having a cathode, a control grid, and a plate, said control grid having a signal input connection, a first battery of the deferred action type having its negative terminal connected to said cathode, a first resistor connected between the positive terminal of the battery and said plate, a storage condenser having one terminal connected to said plate and adapted to be charged by said first battery, a squib connected between the other terminal of the condenser and said cathode, a second deferred action battery having its positive terminal connected to said cathode, a resistor connected between the negative terminal of said second battery and said control grid whereby a negative bias is applied to said control grid to maintain said tube normally non-conductive in the absence of a signal on said grid, both of said deferred action batteries including means making said batteries operative on projection of said missile, and a load connected in shunt relation to said second battery, said second battery having a relatively low charge capacity and said shunt load a relatively low resistance so that said battery charge is depleted within the time of flight of said missile, whereby the negative bias on said control grid is removed thereby permitting discharge of said condenser through said squib in the absence of a reflected signal while said missile is in flight.

3. In a fuze for use in an explosive aerial missile of the type actuated by a signal reflected from a target, a self destroying triggering circuit comprising, a gas filled discharge tube having a cathode, a control grid, and a plate, means connected to said grid for applying a signal thereto, a deferred action battery, a plate load resistor, said battery and resistor being connected in series between said plate and said cathode, a detonating circuit including a storage condenser and a squib in series with each other, said detonating circuit being connected in parallel with said battery and resistor whereby said condenser is adapted to be charged by said battery, a second deferred action battery having its positive terminal connected to said cathode, a second resistor connected between the negative terminal of said second battery and said control grid so that a bias is applied to said grid to maintain said tube normally non-conducting in the absence of a signal, both of said batteries including means for becoming operative on projection of said missile, and a load connected across said second battery, said second battery having a relatively low charge capacity and said load a relatively low resistance whereby said battery charge is depleted within the time of flight of said missile whereby the bias on said control grid is removed thereby permitting discharge of said condenser through said squib in the absence of a reflected signal while said missile is in flight.

References Cited in the file of this patent
UNITED STATES PATENTS

| | | |
|---|---|---|
| 1,892,017 | Stansbury et al. | Dec. 27, 1932 |
| 2,066,603 | Beetem | Jan. 5, 1937 |
| 2,121,117 | Conover | June 21, 1938 |
| 2,301,220 | Lowe | Nov. 10, 1942 |
| 2,409,583 | Perkins | Oct. 15, 1946 |
| 2,416,927 | Kingdom et al. | Mar. 4, 1947 |
| 2,509,910 | Dike | May 30, 1950 |